United States Patent [19]

Miyata et al.

[11] Patent Number: 4,648,222
[45] Date of Patent: Mar. 10, 1987

[54] MOUNT STRUCTURE OF A WINDOWPANE FOR AUTOMOBILE USE

[75] Inventors: Toshimi Miyata, Irumi; Toshiki Takahashi, Asaka; Kenji Matsumoto, Kawagoe, all of Japan

[73] Assignee: Honda Giken Kogyo Kabushiki Kaisha, Tokyo, Japan

[21] Appl. No.: 796,334

[22] Filed: Nov. 12, 1985

[30] Foreign Application Priority Data

Dec. 19, 1984 [JP] Japan .......................... 59-191481[U]

[51] Int. Cl.⁴ ............................................... E06B 3/00
[52] U.S. Cl. ........................................ 52/208; 52/397; 52/400; 296/93
[58] Field of Search .................. 52/208, 397, 400; 296/93

[56] References Cited

U.S. PATENT DOCUMENTS

| 3,274,740 | 9/1966 | Hall | 52/208 |
| 3,705,470 | 12/1972 | Kent | 52/208 |
| 4,458,459 | 7/1984 | Irrgang | 52/208 |
| 4,464,874 | 8/1984 | Shea, Jr. et al. | 52/398 |

FOREIGN PATENT DOCUMENTS

| 1018609 | 10/1957 | Fed. Rep. of Germany | 49/489 |
| 50593 | of 1903 | United Kingdom | 52/209 |

Primary Examiner—Alfred C. Perham
Attorney, Agent, or Firm—Armstrong, Nikaido, Marmelstein & Kubovcik

[57] ABSTRACT

A mount structure of a windowpane for automobile use of the type that the windowpane is directly mounted with the aid of an adhesive material, to a window frame portion of a vehicle body which is formed by folding back a flange portion of an inner panel from the indoor side to the outdoor side so as to wrap an edge of a flange portion of an outer panel to be bonded together, is improved in that the flange portion on the outdoor side of the inner panel that is contiguous to the edge of the flange portion of the outer panel is bent outwardly to integrally form a dam portion, whereby outflow of the adhesive material can be prevented by the dam portion.

3 Claims, 4 Drawing Figures

MOUNT STRUCTURE OF A WINDOWPANE FOR AUTOMOBILE USE

BACKGROUND OF THE INVENTION

1. Field of the Invention

The present invention relates to a mount structure of a windowpane for automobile use in which the windowpane is mounted to the outdoor side of a window frame portion of a vehicle body by making use of an adhesive material.

2. Description of the Prior Art

In one example of the heretofore known window frame portion of a vehicle body of an automobile, a flange portion of an outer panel and a flange portion of an inner panel were superposed on each other and the both flange portions were integrally jointed with each other by spot-welding. However, in such a window frame structure, welding stain and spatter caused by the spot-welding would remain on the indoor side surface of the flange portion of the inner panel, and they deteriorated beautiful appearance of the indoor side surface. In order to improve this shortcoming, a mount structure of a windowpane for automobile use as shown in FIG. 1 which is disclosed in Laid-Open Japanese Utility Model Specification No. 57-125626 was proposed.

More particularly, in such a window frame structure shown in FIG. 1, as a flange portion 03 of an inner panel 02 was folded back to the outer side so that a flange portion 05 of an outer panel 04 may be wrapped by the flange portion 03 of the inner panel 02, the inner panel flange portion 03 and the outer panel flange portion 05 could be integrally jointed with each other to form a window frame portion 01 without relying upon spot-wolding, but in order to prevent an adhesive material 07 for bonding a windowpane 06 to the window frame portion 01 from flowing out towards the central portion of the windowpane 06, it was necessary to bond a dam member 08 to the inner panel flange portion 03 in the proximity of its foldback point.

SUMMARY OF THE INVENTION

It is therefore one object of the present invention to provide a novel mount structure of a windowpane for automobile use which is free from the above-described shortcomings of the mount structures in the prior art.

A more specific object of the present invention is to provide a mount structure of a windowpane for automobile use of the type that in the window frame portion of a vehicle body, an outer panel flange portion and inner panel flange portion are superposed and jointed with each other, which mount structure does not deteriorate beautiful appearance of the indoor side surface nor does not necessitate to add a dam member for preventing an adhesive material from flowing out of the window frame portion towards the central portion of the windowpane.

According to one feature of the present invention, there is provided an improved mount structure of a windowpane for automobile use of the type that the windowpane is directly mounted, with the aid of an adhesive material to an outdoor side of a window frame portion of a vehicle body which window frame portion is formed by folding back a flange portion of an inner panel from the indoor side to the outdoor side so as to wrap an edge of a flange portion of an outer panel and thereby bonding them together, the improvement residing in that the flange portion on the outdoor side of the inner panel that is contiguous to the edge of the flange portion of the outer panel, is bent outwardly to integrally form a dam portion, whereby outflow of the adhesive material can be prevented by the dam portion.

The above-mentioned and other features and objects of the present invention will become more apparent by reference to the following description of preferred embodiments of the invention taken in conjunction with the accompanying drawings.

DESCRIPTION OF THE PREFERRED EMBODIMENTS

In the following, the present invention will be described in greater detail in connection to the preferred embodiments illustrated in FIGS. 2 and 3 as applied to a window in a rear door of an automobile.

Figure 3:
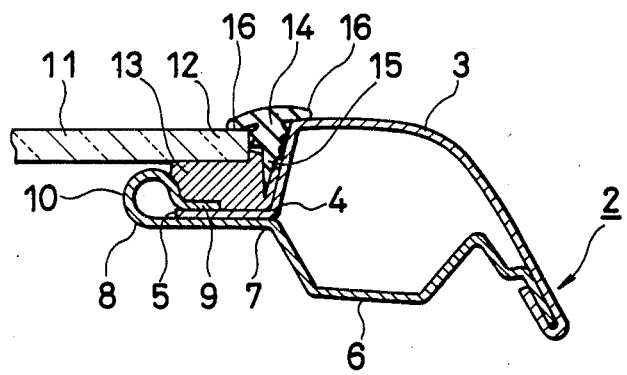
FIG. 3 is a transverse cross-section view of one preferred embodiment of the present invention taken along line III—III in FIG. 2 as viewed in the direction of arrows.

Referring now to FIG. 3, a window frame portion 2 of a rear door 1 is constructed through the process that after a flange portion 7 of an inner panel 6 has been bent from the indoor side towards the outdoor side into a circular cross-section shape so as to wrap an edge 5 of a flange portion 4 of an outer panel 3 and thereby a bead-shaped inflated projection 10 has been formed, an outdoor side flange portion 9 of the inner panel 6 is folded back so as to pinch the flange portion 4 of the outer panel 3 with an indoor side flange portion 8 and the outdoor side flange portion 9 of the inner panel 6, and thereby the flange portion 4 of the outer panel 3 and the flange portion 7 of the inner panel 6 are coupled together.

Then, a peripheral portion 12 of the windowpane 11 is bonded to the flange portion 4 of the outer panel 3 and the outdoor side flange portion 9 of the inner panel 6 by the intermediary of an adhesive material 13, a projecting portion 15 of a packing member 14 is press-inserted into a gap around the peripheral portion 12, and the opposite side edge portions 16 of the packing member 14 are brought into tight contact with the outer panel 3 and the windowpane 11.

Figure 1:
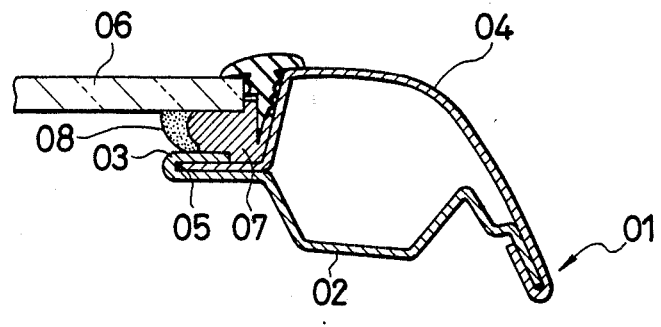
FIG. 1 is a transverse cross-section view of a mount structure of a windowpane for automobile use in the prior art.
Figure 2:
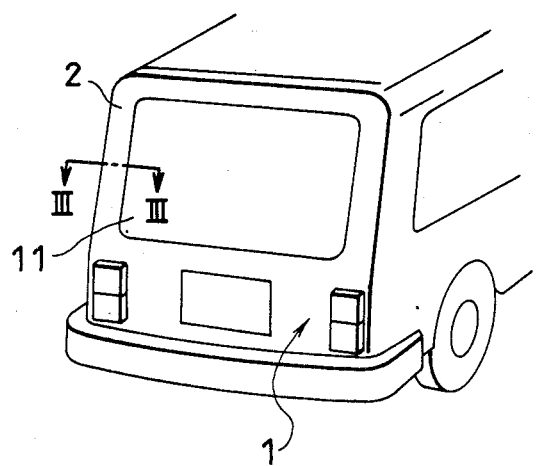
FIG. 2 is a schematic perspective view of an automobile to which the mount structure of a windowpane for automobile use according to the present invention is applicable.

In the preferred embodiment illustrated in FIGS. 2 and 3, since the flange portion 4 of the outer panel 3 and the flange poriton 7 of the inner panel 6 are integrally jointed without relying upon welding, welding stain and sputter are not present on the inner surface of the inner panel 6, and hence the interior of the vehicle can be finished beautifully without especially necessitating an interior finishing material.

In addition, since outflow of the adhesive material 13 towards the central portion of the windowpane can be prevented by the inflated projection 10, the dam member used in the prior art becomes unnecessary, and hence, reduction of a manufacturing cost can be realized by reducing a number of component parts.

Furthermore, owing to the fact that the bead-shaped inflated projection 10 is formed at the outdoor side flange portion 9 of the inner panel 6, a trimming member for covering the edge 5 of the flange portion 4 of the outer panel 3 becomes unnecessary, this also enables to lower a manufacturing cost by reducing a number of component parts, and a bending strength as well as a bending rigidity of the inner edge of the window frame portion 2 can be improved.

Figure 4:
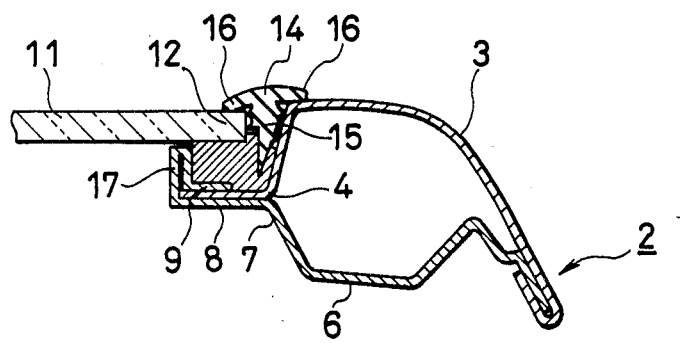
FIG. 4 is a similar transverse cross-section view showing another preferred embodiment of the present invention.

While the outdoor side flange portion 9 of the inner panel 6 was formed into a bead-shaped inflated protrusion 10 in the preferred embodiment illustrated in FIGS. 2 and 3, after the indoor side flange portion 8 and the outdoor side flange portion 9 of the inner panel 6 have been folded and superposed on each other, the folded and superposed portion 17 could be bent outwards and a dam portion could be formed by this folded and superposed portion 17 as shown in FIG. 4. With such a modified embodiment also, beautiful appearance of the interior of the vehicle can be maintained, and the manufacturing cost can be lowered by reducing a number of component parts.

As described above, according to the present invention, since a dam portion for preventing an adhesive material from flowing out, is formed integrally with the outdoor side flange portion of the inner panel by bending the same flange portion, a bending strength as well as a rigidity of the window frame portion of the vehicle body can be enhanced, and also, a manufacturing cost can be reduced by omitting the dam member for preventing an adhesive material from flowing out.

Moreover, owing to the fact that the flange portion of the inner panel is folded back from the indoor side to the outdoor side so as to wrap the edge of the flange portion of the outer panel and thus the respective flange portions are jointed together, welding becomes unnecessary, and thereby beautiful appearance of the indoor surface is improved.

Since many changes and modifications can be made to the above-described construction without departing from the spirit of the present invention, it is intended that all matter contained in the above description and illustrated in the accompanying drawings shall be interpreted to be illustrative and not as a limitation to the scope of the present invention.

What is claimed is:

1. A mount structure of a windowpane for automobile use of the type that the windowpane is directly mounted, with the aid of adhesive material, to the outdoor of a window frame portion of a vehicle body, which window frame portion is formed by superposing a flange portion of an outer panel and a flange portion of an inner panel on each other, characterized in that the flange portion of said inner panel is folded back from the indoor side towards the outdoor side so as to form a dam portion projecting outwards, whereby outflow of said adhesive material can be prevented by said dam portion, and an outdoor side portion of the flange portion of said inner panel is suporposed on an indoor side portion of the flange portion of said inner panel, and the edge of the flange portion of said outer panel is pinched between the indoor side portion and the outdoor side portion of the flange portion of said inner panel to form a three ply juncture.

2. A mount structure of a windowpane for automobile use as claimed in claim 1, wherein the flange portion of said inner panel is folded back from the indoor side towards the outdoor side so as to form a bead-shaped inflated projection having a circular cross-section shape and to pinch the edge of the flange portion of said outer panel between the indoor side portion and the outdoor side portion of the flange portion of said inner panel, and said bead-shaped inflated projection forms said dam portion.

3. A mount structure of a windowpane for automobile use as claimed in claim 1, wherein the flange portion of said inner panel is folded back from the indoor side towards the outdoor side so that the indoor side portion and the outdoor side portion of the flange portion of said inner panel may be superposed on each other with the edge of the flange portion of said outer panel pinched therebetween, and the superposed indoor side portion and outdoor side portion of the flange portion of said inner panel are jointly bent outwards to form said dam portion.

* * * * *